United States Patent
Glancy et al.

Patent Number: 5,266,285
Date of Patent: Nov. 30, 1993

[54] SODIUM-ENHANCED LIME SCRUBBING METHOD FOR REMOVING SULFUR DIOXIDE FROM GASEOUS STREAMS

[75] Inventors: Dennis L. Glancy, Evansville, Ind.; John W. College, Pittsburgh, Pa.; Jim Wilhelm, Sandy, Utah

[73] Assignees: Southern Indiana Gas and Electric Company, Evansville, Ind.; Dravo Lime Company, Pittsburgh, Pa.

[21] Appl. No.: 867,894

[22] Filed: Apr. 13, 1992

[51] Int. Cl.$^5$ .............................. C01B 17/22
[52] U.S. Cl. .................. 423/243.09; 423/243.11
[58] Field of Search .......... 423/242 A, 243.09, 243.11

[56] References Cited

U.S. PATENT DOCUMENTS

| | | | |
|---|---|---|---|
| 3,607,033 | 9/1971 | Shah | 23/167 |
| 3,653,823 | 4/1972 | Shah | 23/129 |
| 3,775,532 | 11/1973 | Shah | 423/242 |
| 3,873,532 | 3/1975 | Dahlstrom et al. | 423/242 |
| 3,919,393 | 11/1975 | Selmeczi | 423/242 |
| 3,944,649 | 3/1976 | Field et al. | 423/242 |
| 3,989,464 | 11/1976 | Dahlstrom et al. | 23/260 |
| 3,989,797 | 11/1976 | Brady et al. | 423/242 |
| 4,009,244 | 2/1977 | Atsukawa et al. | 423/242 |
| 4,147,756 | 3/1979 | Dahlstrom et al. | 423/242 |
| 4,411,875 | 10/1983 | Butler et al. | 423/242 |
| 4,976,937 | 12/1990 | Lee et al. | 423/242 |

*Primary Examiner*—Gregory A. Heller
*Attorney, Agent, or Firm*—Armstrong, Westerman, Hattori, McLeland & Naughton

[57] ABSTRACT

Sulfur dioxide is removed from a gaseous stream by contact with a lime slurry which contains sulfur to produce thiosulfate ions and 2,000–10,000 ppm of effective sodium ions to effect removal of the sulfur dioxide A bleed stream, removed from the scrubbing loop has calcium sulfite solids removed therefrom while separated liquor is returned to the scrubbing loop.

12 Claims, 2 Drawing Sheets

SODIUM-ENHANCED LIME SCRUBBING METHOD FOR REMOVING SULFUR DIOXIDE FROM GASEOUS STREAMS

FIELD OF THE INVENTION

The present invention relates to a method of removing sulfur dioxide from a gaseous stream, such as hot combustion gases, where an aqueous lime slurry is contacted with the gaseous stream.

BACKGROUND OF THE INVENTION

Aqueous lime slurries have been used to remove sulfur dioxide from gaseous streams and still provide one of the major commercial systems for removing sulfur dioxide from hot gaseous streams, such as those produced in commercial power plants. Other popular basic flue gas desulfurization processes include limestone scrubbing, magnesium enhanced lime scrubbing, and dual alkali scrubbing processes, with various modifications of these basic processes in existence.

In the magnesium-enhanced lime scrubbing systems, a controlled amount of magnesium ion is provided in the aqueous lime scrubbing slurry, as described in U.S. Pat. No. 3,919,393, assigned to Dravo Lime Company, the contents of which are incorporated by reference herein. As described therein, about 2-10 percent by weight of magnesium oxide is added to the calcium oxide, which provides a magnesium ion content in a wet scrubbing unit so as to eliminate scale formation in the wet scrubbing unit while minimizing the amount of magnesium sulfite and sulfate in the effluent from the wet scrubbing unit While this process has found favor in the industry, a drawback exists in that the filter cake produced upon separating solids from the effluent from the wet scrubbing unit is relatively wet and contains typically only about 40-45% solids This gives rise to relatively high disposal costs and difficulty in handling of the wet solids or sludge, as it is called.

The dual alkali scrubbing process, which uses an alkali, such as sodium, in aqueous solution to remove sulfur dioxide from gaseous streams, while using a solution and thus avoids scaling in the wet scrubbing unit, have a relatively high cost connected therewith due to the soda ash ($Na_2CO_3$) used to provide soluble sodium for scrubbing. The dual alkali process scrubs with a clear liquor and generally produces a relatively dry filter cake, but at the relatively high cost associated with the use of soda ash. Examples of various dual alkali processes are described in U.S. Pat. No. 3,607,033; U.S. Pat. No. 3,775,532; U.S. Pat. No. 3,873,532; U.S. Pat. No. 3,944,649; U.S. Pat. No. 3,989,464; U.S. Pat. No. 3,989,797; U.S. Pat. No. 4,147,756; and U.S. Pat. No. 4,411,875, the contents of these eight patents incorporated by reference herein.

In the dual alkali processes, the alkali metal compound, such as soda ash, in aqueous solution, is used in the wet scrubbing unit and sodium salts, such as sodium sulfite removed from a bleed stream from the wet scrubbing unit. The sodium component is regenerated, outside the wet scrubbing unit, such as by addition of lime to the effluent which reacts with the sodium sulfite to form calcium sulfite, that is removed from the system, and sodium sulfite which is returned to the wet scrubbing unit for further scrubbing of sulfur dioxide gases In such processes, it is emphasized that good separation of the regeneration products be effected so as to prevent return of calcium ions to the scrubber which could cause scaling It is an object of the present invention to provide a sulfur dioxide scrubbing method using lime that decreases the high cost of soda ash associated with the dual alkali processes and produces a dry filter cake from the scrubber effluent while using the reliability of having soluble alkalinity associated with a magnesium-enhanced lime process for neutralizing absorbed sulfur dioxide.

SUMMARY OF THE INVENTION

Sulfur dioxide is removed from a gaseous stream in a wet scrubbing unit where a lime slurry which contains sulfur to produce thiosulfate ions to lessen oxidation and sodium ions to effect sulfur dioxide removal is contacted with the gaseous stream. A bleed stream is removed from the scrubbing loop and calcium sulfite solids are removed from the bleed stream, with the overflow liquor returned to the scrubbing loop.

The sodium ions are present in the wet scrubbing unit in an amount of between about 2,000 to 10,000 parts per million effective sodium ions, while the thiosulfate ions are preferably present in an amount to provide a thiosulfate ion concentration in the wet scrubbing unit of between about 0.02 to 0.15 molar concentration

DESCRIPTION OF THE DRAWINGS

The invention will be more readily understood by reference to the embodiment thereof shown in the drawings, wherein.

DETAILED DESCRIPTION

Figure 1:
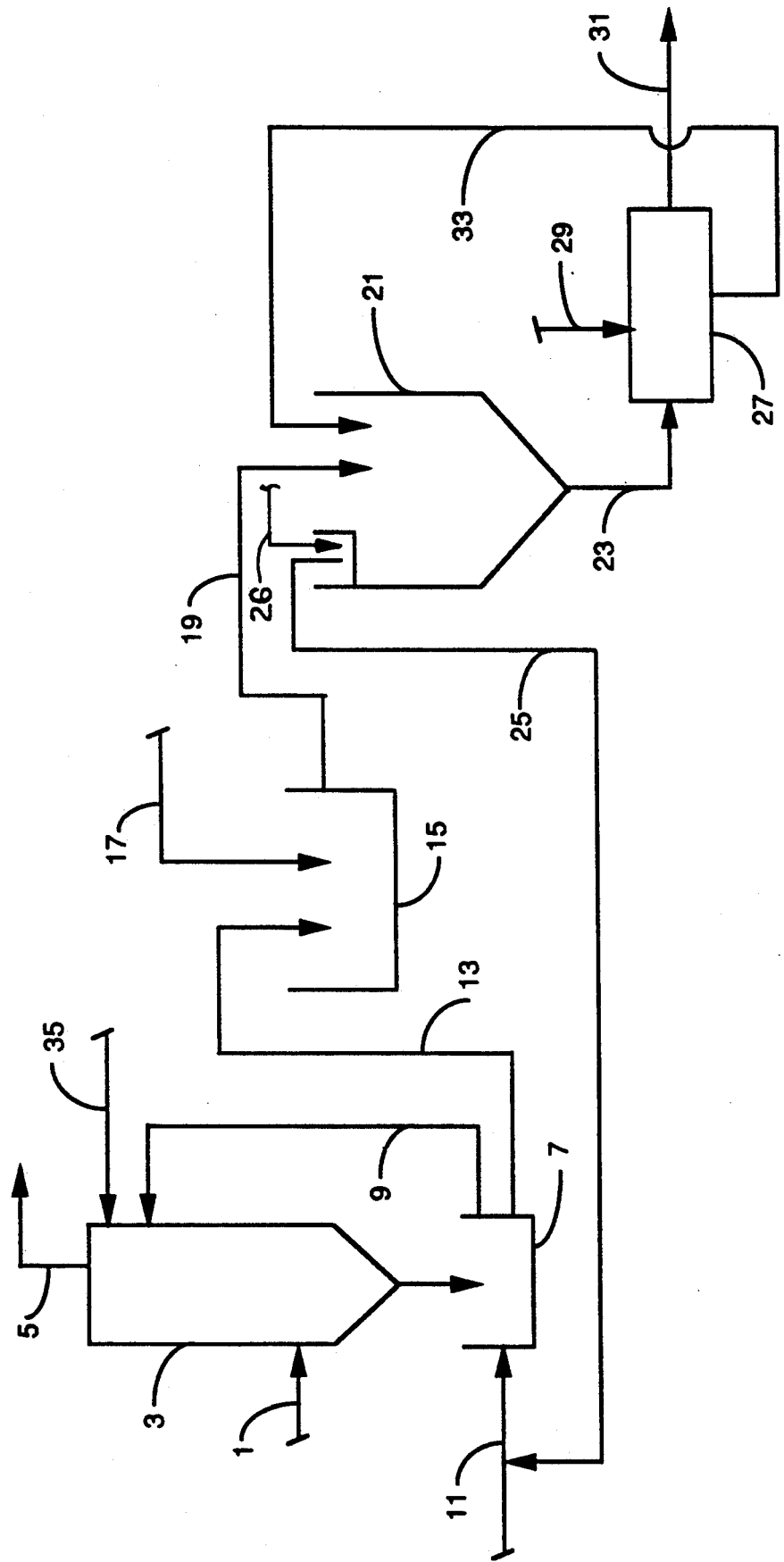
FIG. 1 schematically illustrates a conventional dual alkali process where an aqueous solution of a sodium component is used to scrub sulfur dioxide from a gaseous stream and lime subsequently used to regenerate the scrubbing solution.

Referring now to FIG. 1 which schematically illustrates a conventional sodium scrubbing or dual alkali process, a gas containing sulfur dioxide is fed through line 1 to a wet scrubbing unit 3, with scrubbed gases discharged through line 5. A solution of sodium scrubbing component, such as sodium sulfite, in a hold tank 7 is recirculated by means of recycle line 9 through the scrubber, with discharge from the scrubber returned to the hold tank 7. Make-up sodium ion is provided through line 11, such as by addition of sodium carbonate or sodium hydroxide. Where sodium carbonate is used as the sodium ion source, the reactions in the scrubbing unit may be listed as follows:

$$Na_2CO_3 + 2NaHSO_3 \rightarrow 2Na_2SO_3 + CO_2 \uparrow + H_2O; \quad (1)$$

$$SO_2 + H_2O + Na_2SO_3 \rightarrow 2NaHSO_3; \quad (2)$$

while if sodium hydroxide is used, the reactions may be listed as:

$$NaOH + NaHSO_3 \rightarrow Na_2SO_3 + H_2O; \quad (3)$$

$$SO_2 + H_2O + Na_2SO_3 \rightarrow 2NaHSO_3. \quad (4)$$

The pH in the wet scrubbing unit is generally maintained at a value between 6.0 to 6.2, and a sodium ion content in excess of 30,000 parts per million (ppm); generally about 46,000 ppm is present. A bleed stream, to remove sulfur products of the scrubbing process, such a sodium bisulfite (NaHSO$_3$) is removed from the scrubbing loop in line 13. The bleed stream from line 13 is fed to a regenerator 15, with lime, or other calcium compound, also fed through line 17. In the regenerator, the following reactions occur:

$$Ca(OH)_2 + Na_2SO_3 \rightarrow CaSO_3 \downarrow + 2NaOH; \qquad (5)$$

$$2NaOH + 2NaHSO_3 \rightarrow 2Na_2SO_3 + 2H_2O; \qquad (6)$$

which combined, may be given as:

$$Ca(OH)_2 + 2NaHSO_3 \rightarrow CaSO_3 \downarrow + Na_2SO_3 + 2H_2O. \qquad (7)$$

The regeneration is usually effected at a pH of between 8.5-11, with calcium sulfite precipitating as a solid. After regeneration, the bleed stream is passed by line 19 to a thickener tank or separator 21, where the solid calcium sulfite is removed through line 23 and discharged, while the aqueous solution, still at a pH of between 8.5-11, which contains sodium sulfite, is returned through line 25 to the hold tank 7, with make-up sodium carbonate added through line 26. The solid calcium sulfite discharged through line 23 is concentrated, such as in a filter 27, with wash water added through line 29 to wash the solids. The washed solids are discharge through line 31, while wash liquid and liquid removal from the solids is recycled to the separator 21, through line 33. In the scrubber, fresh water, added through line 35, must be used to wash the demisters (not shown) in the wet scrubbing unit 3. The solids content of filtered media from line 31 is generally about 50-65 present by weight solids.

With such a dual alkali process, where sodium ions are used in the wet scrubbing unit for absorption of the sulfur dioxide and also for regeneration of the scrubbing liquor, large amounts of a sodium compound, such as sodium carbonate, must be added to the scrubbing system. Also, some oxidation of sodium sulfite to sodium sulfate is effected in the wet scrubbing unit, which sodium sulfate is ineffectual for sulfur dioxide removal and builds up in the scrubbing loop as an unwanted impurity. This is why a high sodium ion concentration, in excess of 30,000 ppm and generally on the order of 46,000 ppm is required, with the addition of expensive sodium carbonate (soda ash) to the scrubbing system.

Figure 2:
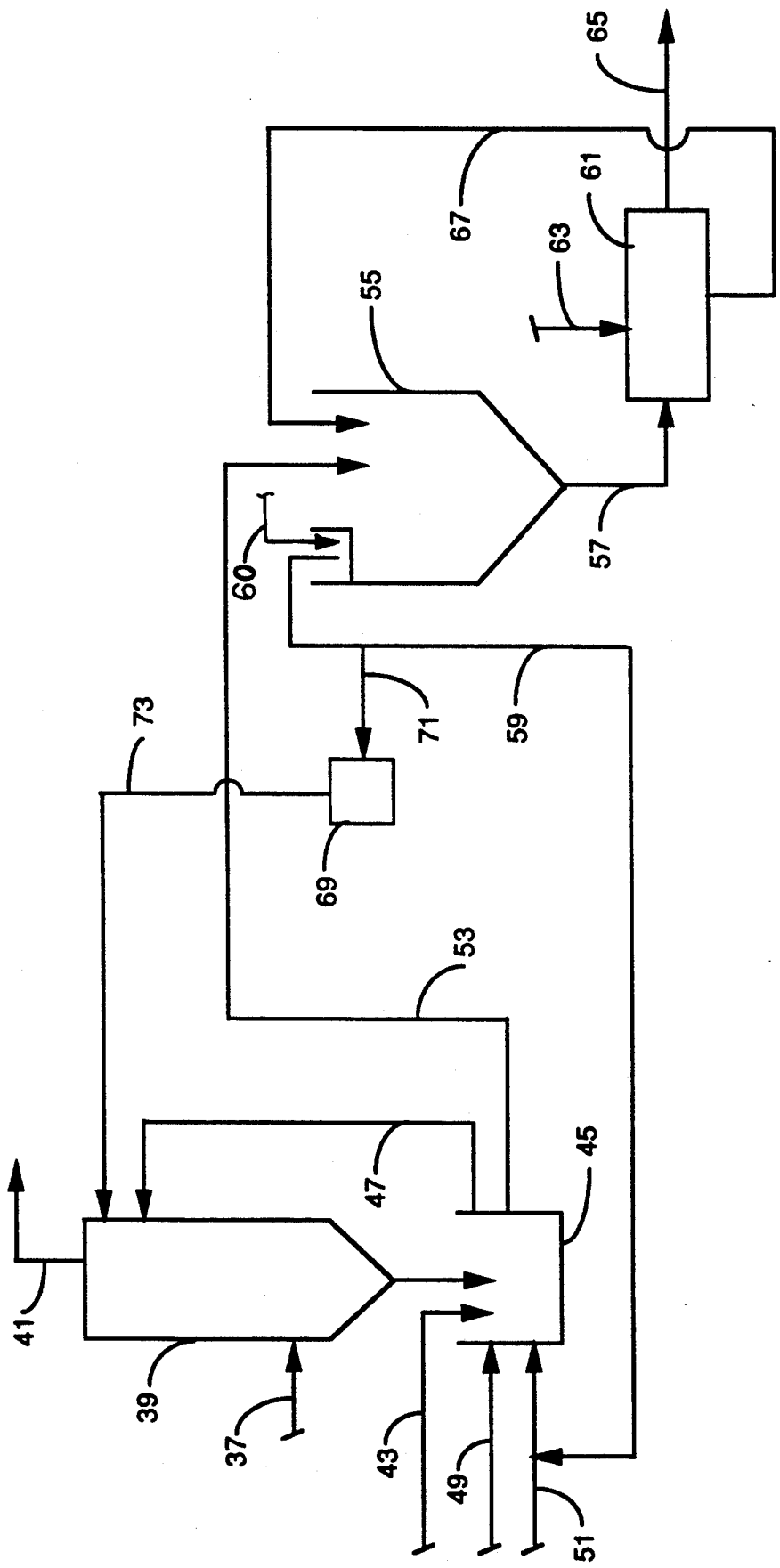
FIG. 2 schematically illustrates the present method where a lime slurry containing thiosulfate ions and sodium ions is used to scrub sulfur dioxide from a gaseous stream.

The present process is schematically illustrated in FIG. 2, which shows a lime scrubbing process containing sodium ions and sulfur. Sulfur dioxide-containing gases through line 37 are charged to a wet scrubbing unit 39, with clean gases discharged therefrom through line 41. An aqueous lime slurry, from line 43 is charged to a hold tank 45 and the slurry recycled through line 47 to the wet scrubbing unit 39, with discharge from the scrubbing unit 39 returned to the hold tank 45. Sulfur is also added to the scrubbing slurry, such as through line 49 to hold tank 45, and sodium ion is added, such as by addition of sodium carbonate, to the hold tank 45 through line 51. A preferred means of adding sulfur is in the form of calcium thiosulfate and calcium polysulfides formed by reaction of lime and emulsified sulfur as described in U.S. Pat. No. 4,976,937, assigned to Dravo Lime Company, and the contents of which are incorporated by reference herein.

In the scrubbing unit, the pH is maintained at a value of between 6.0 to 7.5 and preferably at a pH of about 7.0. The sulfur added should be in an amount which will provide a thiosulfate ion in an amount of between about 2240 to 16,800 ppm, preferably about 7,000 ppm, or a molar concentration of between about 0.02-0.15, as $S_2O_3=$. The sodium compound should be added in an amount which will provide between 2,000 to 10,000 ppm, preferably 5,000 to 10,000 ppm, effective sodium ions in the aqueous lime scrubbing slurry in the wet scrubbing unit 39. The effective amount of sodium ions in such a scrubbing slurry is that amount over and above the chloride ion content of the aqueous media present in the wet scrubbing unit. Since chloride ions will interfere with the effect of sodium ions present in the scrubbing media, only those sodium ions over and above that required to form sodium chloride in the wet scrubbing are considered to be "effective" in the removal of sulfur dioxide from the sulfur-dioxide-containing gases. The amount of sodium ions added should be an amount sufficient to provide a sulfite ($SO_3=$) ion content in the aqueous media present in the wet scrubbing unit of between about 2000 to 8000 parts per million (ppm).

The lime used in the aqueous scrubbing slurry may be a high calcium lime or a lime containing magnesium, such as a lime described in the aforementioned U.S. Pat. No. 3,919,393, containing about 2-10 present by magnesium oxide. As with the sodium ions, the magnesium ions are effected by the chloride ion content of the aqueous media, and the amount of magnesium ion present in the scrubbing unit may be up to about 9,000 parts per million of effective magnesium ions, i.e. that over and above that required to form magnesium chloride in the scrubbing media with chloride ions present therein. Where sodium ions and magnesium ions are both present in the scrubbing media, the effective sodium ion content would also include the magnesium ion content of the scrubbing media A bleed stream of slurry from the scrubbing loop is passed through line 53 to a thickener 55, which bleed stream will contain sodium bisulfite and sodium sulfite in solution, and calcium sulfite as a solid. The solid calcium sulfite is separated from the liquor and discharged through line 57, while the solution of sodium bisulfite and sodium sulfite, still at a pH of about 7.0 is returned to the hold tank 45 for re-use through line 59, with make-up sodium carbonate added through line 60. The solid calcium sulfite from line 57 is filtered, or otherwise concentrated, in filter 61 and washed with wash water from line 63. The washed solids are discharged through line 65 while liquid filtrate is returned to the separator 55 through line 67. The solids content of the filtered media in line 65 will be about 60-70 percent by weight solids.

In the present process, fresh water need not be used to wash the demisters in the wet scrubbing unit 39, but rather thickener overflow liquid may be used. To effect such washing, a collection tank 69 may be provided, with a portion of the thickener overflow liquid from line 59 diverted through line 71 to the collection tank 69, and then used, as desired, through line 73 to wash the demisters (not shown) in the wet scrubbing unit 39. Sodium carbonate for use in the system may also be added to the collection tank 69.

In the present process, with sodium ions used in the presence of a lime slurry and sulfur to provide a thiosulfate ion concentration in the wet scrubbing unit, the build-up of sulfates is lessened, and the lime acts as a neutralizing agent, which lowers significantly the amount of sodium that must be added to the scrubbing loop. Also, the lower sulfate concentration in the scrubbing media improves the particle growth of calcium sulfite that is to be removed from the system providing easier separation and a drier solid waste.

COMPARATIVE EXAMPLE

As an example of the benefits of its present process, the following is indicative.

A. At a 265 MW dual alkali process facility a clear high alkaline liquor was used to scrub flue gas, using a dual alkali process as described in U.S. Pat. No. 3,989,797. The gas contactor 3 had an L/G ratio of 17-25 gallons per minute of absorber liquid per 1000 actual cubic feet of scrubbed flue gas, depending on load and recycle rates. The pH of the absorber is allowed to drift as emissions are controlled by liquid flow through the system. As emissions approach the cap level the flow of regenerated liquor containing large quantities of dissolved sodium, sulfite and sulfate is increased. This liquor pH is approximately 11 and is highly alkaline.

The flow of the regenerator return 25 to the recycle tank 7 was controlled by the emission level The pH of the recycle tank 7 drifts between 4.9 and 6.0 (pH is normally controlled between 6.0 to 6.5). Oxidation of sulfites depletes the alkalinity and produces sulfates that must be carried as a dissolved salt in solution. The liquid phase of this type of scrubber carries very high sodium levels (50,000 mg/l) with associated sulfites and sulfates and a total dissolved solids level of 12-18%.

The scrubber 3 is bled to a regeneration tank 15 where lime slurry is used to precipitate calcium sulfite/sulfate crystals. The pH is held at 11.0 in this tank as the sodium bisulfite converts to sodium sulfite and some sodium hydroxide is produced, while some of the sulfates precipitate but generally stay in solution.

The regeneration tank 15 discharges to the thickener 21 where the solid phase is separated from the liquid phase.

The pH 11 thickener overflow (T.O.F.), in line 25, becomes the highly alkaline liquor source for scrubber. If the T.O.F. alkalinity is not high enough, further $Na_2CO_3$ solution is added to the thickener trough through line 26. This $Na_2CO_3$ dissolves and the sodium becomes the absorbing cation for $SO_2$ in the scrubber.

The composition of the solution used is given in the following Table under "A".

B. The composition of a typical magnesium-lime process, such as described in U.S. Pat. No. 3,919,393, is given in the following Table under "B".

C. The present process was tested at a 265 MW power plant. The liquid to gas ratio was in the range of 17-25 gallons per 1000 cf of gas. The exiting gas temperature was approximately 130° F. The scrubber was a 3 stage disc-and-donut contactor. Lime slurry was made by adding lime to water. During slaking the lime slurry was modified by the addition of sulfur slurry. This sulfur addition to the hot lime slurry reacts to form calcium sulfides or polysulfides. These calcium sulfides are at low levels in respect to the total composition of the lime slurry. The major component of the lime slurry is $Ca(OH)_2$ as in most conventional lime scrubbing operations. The solids content of this slurry was generally around 20%.

The scrubbing unit consisted of an absorption tower and recycle tanks. The recycle tanks located below the absorber tower contained scrubbing liquid with high liquid alkalinity. This alkalinity is in the form of sodium sulfite, $Na_2SO_3$. The pH of this liquid drops as $SO_2$ is captured in the absorber. In this test program the pH in the recycle tank was controlled between 6.5 and 7.0 by using the lime slurry. The lime slurry feed rates to the tank would speed up or slow down based on the pH of the tank.

In the recycle tank the incoming lime slurry dissolves and reacts with the bisulfite or sulfite in solution to form calcium sulfite. The calcium sulfides react with the sulfites to form thiosulfate ion. It was found in this particular system that a thiosulfate level of 5000 ppm had an extreme effect on the oxidation of the liquid phase. The sulfite to sulfate molar ratio was generally in the range of 1:1 to 2:1. The reduction in the sulfate level in solution allowed the low level of sodium to maintain high sulfite alkalinity as the remaining sodium was paired with the alkaline sulfites. The dissolved solids were 1/5 of that found in the normal dual alkali system.

The regeneration of the scrubber alkalinity was performed in the recycle tank 45, by the addition of lime slurry directly to the recycle tank. The calcium sulfite solids are formed in the recycle tank. The concentration of these solids were maintained at 2-4%. This precipitation reaction taking place in the recycle tank 45 eliminates the need for the regeneration tank used in the dual alkali process.

As seen by the Table, the calcium sulfite crystals grew to fairly large sizes (25-35 microns). This was a result of controlling the oxidation with thiosulfate and maintaining the proper sulfite levels in solution. Nucleation was reduced by reducing the sulfite/sulfate levels and the co-precipitation effects of the sulfate were minimized by the oxidation reduction. The particles that formed were more dense than in comparison to other FGD systems as the settling rate was about 10 times as fast as the magnesium-lime process and equivalent to the dual alkali process.

To maintain a 2-4% solids level in the recycle tank 45 the recycle slurry was bled to a thickener 55. The thickener pH was equivalent to the scrubber pH. The solids settled in the thickener 45 and were pumped to a belt filter 61. The filtered by-product % solids through line 65, as shown in the Table, were in the range of 60-71%. The filter 61 was washed to recover sodium and thiosulfate and reduce the chemical make-up needs. The filtrate through line 67 was returned to the thickener 55. The clear thickener overflow in line 59, to which make up sodium carbonate was added through line 60, was recycled back to the scrubber for make up.

The TOF carried with it the sodium sulfites and thiosulfate needed for $SO_2$ capture and oxidation inhibition. This TOF is highly alkaline with low dissolved solids and was used as mist eliminator wash for increased $SO_2$ removal and scale control. If the sodium level in the system dropped, liquid sodium carbonate would be added to ensure proper system chemistry.

TABLE

| Composition of Liquid Phase | Conventional Dual Alkalai Process (US 3,989,797) | Magnesium-lime Process (US 3,919,393) | Present Process Low Sodium |
|---|---|---|---|
| Na mg/l | 45,000–55,000 | 100 | 5,000–10,000 |
| $SO_3$ mg/l | 24,000 | 3,000 | 5,000 |
| $SO_4$ mg/l | 62,000–70,000 | 10,000 | 7,000 |
| Cl mg/l | 3,500 | 3,500 | 3,500 |
| Mg mg/l | 0 | 4,500 | 1,000 |
| Ca mg/l | 50 | 50 | 50 |
| $S_2O_3$ mg/l | — | 200 | 6,000 |
| pH mg/l | 11.0 | 7.0 | 7.0 |
| Filter Cake | | | |
| % moisture | 35–50 | 55–60 | 35–40 |
| % solids | 50–65 | 40–45 | 60–65 |
| Particle Size (microns) | 45–60 | 15–20 | 30–35 |

In the present sodium-enhanced lime scrubbing process, the sulfur dioxide removal efficiency can reach 98 percent or more at lower liquid to gas ratios. The use of sulfur modified lime provides thiosulfate in a sodium sulfite system with a conversion rate of sulfur to thiosulfate in excess of 80 percent in a sodium system.

In our process, calcium sulfite crystals are produced in a sodium scrubbing liquor with oxidation inhibition, which crystals settle and dewater extremely well, and the sludge produced continues to drain when landfilled. The sludge need not be mixed with other additives such as flyash or lime, and handles better than a conventional dual alkali sludge.

The process provides the ability to operate a sodium scrubber with low dissolved solids and a lower liquor viscosity, which lower viscosity allows better filter cake washing and increased sodium recovery. Sodium recovery by washing the sludge on a belt filter decreases the amount of sodium feed required for the system.

With the oxidation inhibition provided, the scrubber using sodium operates at much lower sodium levels than a dual alkali process by exclusion of sulfate from the solution, and an ability is provided to maintain a high alkaline solution with high sulfites and low sodium levels. The use of a highly alkaline liquor for mist eliminator wash provides for scale control over fresh water used in a conventional dual alkali process.

A non-scaling system is provided by pH control at 6.5 to 7.0 in the recycle tank verses the 11.0 pH in a conventional dual alkali system. Such scale is known to form at high pHs. Increased lime utilization is also effected, since pH control problems at pH 11 in a conventional dual alkali system causes excess lime to be added to the system which passes out of the system unreacted.

What is claimed is:

1. In a method of removing sulfur dioxide gases from a gaseous stream where the gaseous stream is contacted with an aqueous slurry of calcium hydroxide in a wet scrubbing unit, with formation of calcium sulfite that is removed from a bleed stream from the wet scrubbing unit, the improvement comprising:
   adding sulfur to said aqueous slurry of calcium hydroxide in an amount to provide sufficient thiosulfate ions to to inhabit oxidation in said wet scrubbing unit; and
   adding to said aqueous slurry of calcium hydroxide a sodium compound in an amount sufficient to provide between about 2,000 to 10,000 parts per million of effective sodium ions in said aqueous slurry in said wet scrubbing unit.

2. The method of removing sulfur dioxide gases from a gaseous stream as defined in claim 1, wherein said sodium compound is added to provide an effective sodium ion content of between about 5000–10,000 ppm.

3. The method of removing sulfur dioxide gases from a gaseous stream as defined in claim 1, wherein said sulfur is added to provide a thiosulfate ion concentration of between about 0.02 to 0.15 molar concentration in said wet scrubbing unit.

4. The method of removing sulfur dioxide gases from a gaseous stream as defined in claim 1, wherein the pH of the scrubbing slurry in said scrubbing unit is held between 6.0 to 7.5.

5. The method of removing sulfur dioxide gases from a gaseous stream as defined in claim 4, wherein said bleed stream has a pH of about 7.0.

6. The method of removing sulfur dioxide gases from a gaseous stream as defined in claim 1, wherein said calcium hydroxide is formed by slaking a lime containing about 2–10 present by weight of magnesium oxide.

7. The method of removing sulfur dioxide gases from a gaseous stream as defined in claim 1 wherein the amount of sodium ions added is that sufficient to provide a sulfite ion content of between about 2000 to 8000 parts per million.

8. In a method of removing sulfur dioxide gases from a gaseous stream where the gaseous stream is contacted with an aqueous slurry of calcium hydroxide in a wet scrubbing unit, with formation of calcium sulfite that is removed from a bleed stream from the wet scrubbing unit, the improvement comprising:
   maintaining the pH of the scrubbing slurry in said scrubbing unit between 6.0 to 7.5;
   adding sulfur to said aqueous slurry of calcium hydroxide in an amount to provide a thiosulfate ion concentration of between about 0.02 to 0.15 molar concentration to inhabit oxidation in said wet scrubbing unit; and
   adding to said aqueous slurry of calcium hydroxide a sodium compound in an amount sufficient to provide between about 2,000 to 10,000 parts per million of effective sodium ions in said aqueous slurry in said wet scrubbing unit.

9. The method of removing sulfur dioxide gases from a gaseous stream as defined in claim 8, wherein said sodium compound is added to provide an effective sodium ion content of between about 5,000–10,000 ppm.

10. The method of removing sulfur dioxide gases from a gaseous stream as defined in claim 8, wherein said bleed stream has a pH of about 7.0.

11. The method of removing sulfur dioxide gases from a gaseous stream as defined in claim 8, wherein said calcium hydroxide is formed by slaking a lime containing about 2–10 present by weight of magnesium oxide.

12. The method of removing sulfur dioxide gases from a gaseous stream as defined in claim 8, wherein the amount of sodium ions is that sufficient to provide a sulfite ion content of between about 2000 to 8000 parts per million.

* * * * *